(12) United States Patent
Al-Nabulsi

(10) Patent No.: US 6,294,750 B1
(45) Date of Patent: *Sep. 25, 2001

(54) METHOD AND APPARATUS FOR AUTOMATICALLY ADJUSTING AIR PRESSURE IN A PNEUMATIC WELD HEAD

(75) Inventor: Talal M. Al-Nabulsi, San Gabriel, CA (US)

(73) Assignee: Unitek Miyachi Corporation, Monrovia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/387,076

(22) Filed: Aug. 31, 1999

Related U.S. Application Data

(63) Continuation-in-part of application No. 08/874,386, filed on Jun. 13, 1997, now Pat. No. 5,954,976.

(51) Int. Cl.[7] .............................. B23K 3/047; B23K 11/24
(52) U.S. Cl. ...................................... 219/85.22; 219/85.19; 219/86.51; 219/89
(58) Field of Search ................................. 219/86.51, 110, 219/85.19, 86.22, 86.41, 86.61, 89, 91.1

(56) References Cited

U.S. PATENT DOCUMENTS

| | | | |
|---|---|---|---|
| 2,472,368 | 6/1949 | Cox et al. ................................ | 219/4 |
| 3,553,420 | 1/1971 | Shearer, Jr. et al. .................. | 219/110 |
| 3,727,822 | 4/1973 | Umbaugh et al. ........................ | 228/1 |
| 3,925,635 | 12/1975 | Schneider ................................ | 219/89 |
| 4,317,980 | 3/1982 | Goodrich et al. ................. | 219/117.1 |
| 4,419,558 | 12/1983 | Stiebel .................................. | 219/109 |
| 4,484,056 | * 11/1984 | Rossell ............................... | 219/86.51 |
| 4,605,833 | * 8/1986 | Lindberg ............................ | 219/86.51 |
| 4,733,042 | 3/1988 | Nishiwaki et al. .................... | 219/89 |
| 5,360,958 | 11/1994 | Bogue et al. ..................... | 219/86.51 |
| 5,954,976 | * 9/1999 | Al-Nabulsi ........................ | 219/86.51 |

* cited by examiner

*Primary Examiner*—Clifford C. Shaw
(74) *Attorney, Agent, or Firm*—Christie, Parker & Hale, LLP

(57) ABSTRACT

A pressure regulator system for a pneumatically- or hydraulically-actuated weld head. The weld head includes a switching valve comprising several ports: an inflow port attached to a source of pressurized gas, preferably air; an exhaust port; a first line port; and a second line port. Two-way valves are provided on the first line port and the second line port. A valve sensor connected to a switch for determining weld force in the weld head is connected to means for simultaneously closing the first line port valve and the second line valve port when a desired weld force is attained between one or more electrodes and a workpiece, thereby maintaining a constant, maximum pressure in the cylinder and consequently maintaining the desired weld force between the electrode(s) and the workpiece during the welding operation.

28 Claims, 16 Drawing Sheets

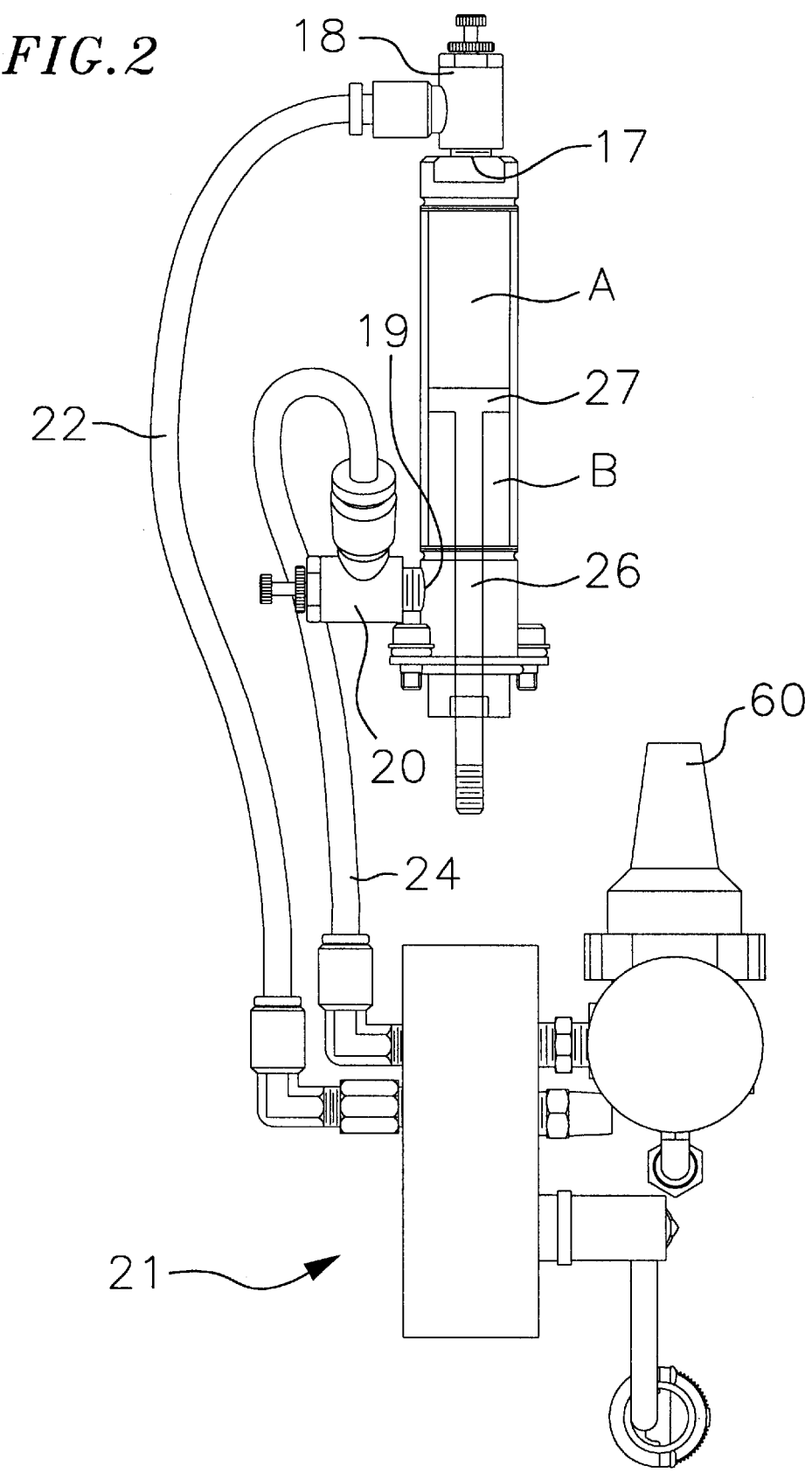

METHOD AND APPARATUS FOR AUTOMATICALLY ADJUSTING AIR PRESSURE IN A PNEUMATIC WELD HEAD

REFERENCE TO RELATED APPLICATIONS

This application is a continuation-in-part of application Ser. No. 08/874,386, filed Jun. 13, 1997 now U.S. Pat. No. 5,954,976; the contents of which are hereby incorporated by reference.

BACKGROUND OF THE INVENTION

This invention relates to pneumatically actuated resistance weld heads and reflow solder heads. More particularly, the invention relates to weld and reflow solder heads having an automatic cutoff of pressurized gas in a pneumatic cylinder when a desired weld force between an electrode and workpiece is attained.

For convenience, hereinafter the terms "weld" and "welding" shall refer to both resistance welding and reflow soldering systems and operations.

Air-actuated weld heads typically include an air cylinder which controls the upward and downward motion of one or more electrodes used to weld or reflow solder a workpiece. Such weld heads are adjustable and may be adapted for welding different types of workpieces.

Typically, different welding applications require different welding parameters. These parameters include the duration and magnitude of electrical weld energy, and the weld force, which is the force exerted on the workpiece by the electrode.

Typically, in known air-actuated weld heads, a maximum air pressure in the air cylinder is set separately from the weld force, which is usually set by precompressing a spring in the weld head connected between the air cylinder and the electrode. One problem associated with this manner of setting up the weld head for a new welding application is that, if set incorrectly, the air cylinder may continue to exert pressure on the electrode after the desired weld force has been attained resulting in excessive weld force.

In most weld heads, a force firing switch is operatively connected to the spring for sensing when the desired weld force is reached; that is, when the force applied by the air cylinder overcomes the precompression spring force. When the force firing switch activates in response to a desired weld force, it signals a microcontroller in a welding power supply to supply electrical current to the electrode(s) to initiate welding. The air cylinder is preset by manually setting pressure regulators on the air cylinder to a maximum pressure at which the force firing switch just activates. This is usually determined by first presetting the spring to the desired weld force and then performing a "dry run" with the air cylinder set to a pressure judged to be slightly above the target maximum pressure in the air cylinder corresponding to the desired weld force. During the dry run, the operator must first observe actuation of the force firing switch, note the pressure in the air cylinder, and then set the air cylinder pressure regulator for precisely that pressure. This procedure must be repeated any time a welding application requires a different weld force.

Such manual operation invites human error. This may occur in the form of an inaccurate initial setting, or by the operator forgetting to reset the air pressure in the cylinder for a new welding application. Such inaccurate settings can result in either an excessive or inadequate weld force, resulting in damaged welds or insufficient pressure to activate the force firing switch.

Furthermore, pressure settings in the air cylinder valves may drift, requiring subsequent adjustments to maintain the desired weld force. Such valve drift may go unnoticed through several welding operations, increasing the potential for unsatisfactory welds. Also, such continual adjustment increases the potential for human error.

SUMMARY OF THE INVENTION

A weld head or reflow solder head according to one embodiment of the invention includes an electrode controlled by a pneumatic cylinder, the pneumatic cylinder operating to force the electrode onto the workpiece and to retract the electrode off from the workpiece. For convenience, hereinafter the terms "weld" and "welding" shall refer to both welding and reflow soldering systems and operations. The pneumatic cylinder includes a first gas line and a second gas line. When pressing the electrode onto the workpiece, the first gas line supplies pressurized gas, preferably air, to the pneumatic cylinder and the second line exhausts the pressurized gas from the pneumatic cylinder. The weld head also includes a switch, having an on state and an off state, which is switched on when the electrode presses onto the workpiece with a desired weld force and means for simultaneously supplying electrical energy to the electrode for welding when the switch is on. The weld head also includes means for sealing the first gas line and the second gas line when the switch is on, thereby maintaining a desired pressure in the pneumatic cylinder.

In an alternate embodiment, the weld head includes a hydraulic cylinder instead of a pneumatic cylinder. The hydraulic system of the alternate embodiment operates in a manner analogous to that of the above described pneumatic system as the same principles of fluid dynamic apply.

One embodiment of a pressure regulator system according the present invention comprises a switching valve. The switching valve includes four ports: an inflow port; an exhaust port; a first gas line port; and a second gas line port. Attached to each of the gas line ports is a two-way valve. The pressure regulator system includes a valve sensor for determining an activated state of a weld force sensor incorporated in the weld head. The pressure regulator system also includes means for substantially simultaneously closing and sealing the two-way valves on the first gas line port and the second gas line port when the sensor determines an activated state of the weld force sensor.

According to another embodiment of the invention, a weld force in a pneumatically actuated welding system is controlled by performing the following steps which include moving an electrode onto a workpiece with a pneumatic cylinder and forcing the electrode onto the workpiece. Once a desired weld force is sensed between the electrode and the workpiece, the air supplied to and exhausted from the pneumatic cylinder is blocked. In this manner, the desired pressure in the pneumatic cylinder corresponding to the desired weld force is maintained in the cylinder during the welding operation.

By automatically cutting off the gas flow to the pneumatic cylinder when the desired weld force is attained in each welding operation, the above described embodiments of the invention provide several advantages over known weld heads. These advantages include eliminating human error due to inaccurate presetting of the maximum gas pressure in the pneumatic cylinder and automatic drift of the valve settings on the pneumatic cylinder, thereby improving the repeatability of the welding operation.

DESCRIPTION OF THE DRAWINGS

The foregoing features and advantages of the invention will be better understood by referring to the following drawings:

FIG. 2 is a partially cut-away elevational view of an air cylinder and a switching valve of the embodiment shown in FIG. 1;

DETAILED DESCRIPTION OF THE INVENTION

Figure 1:
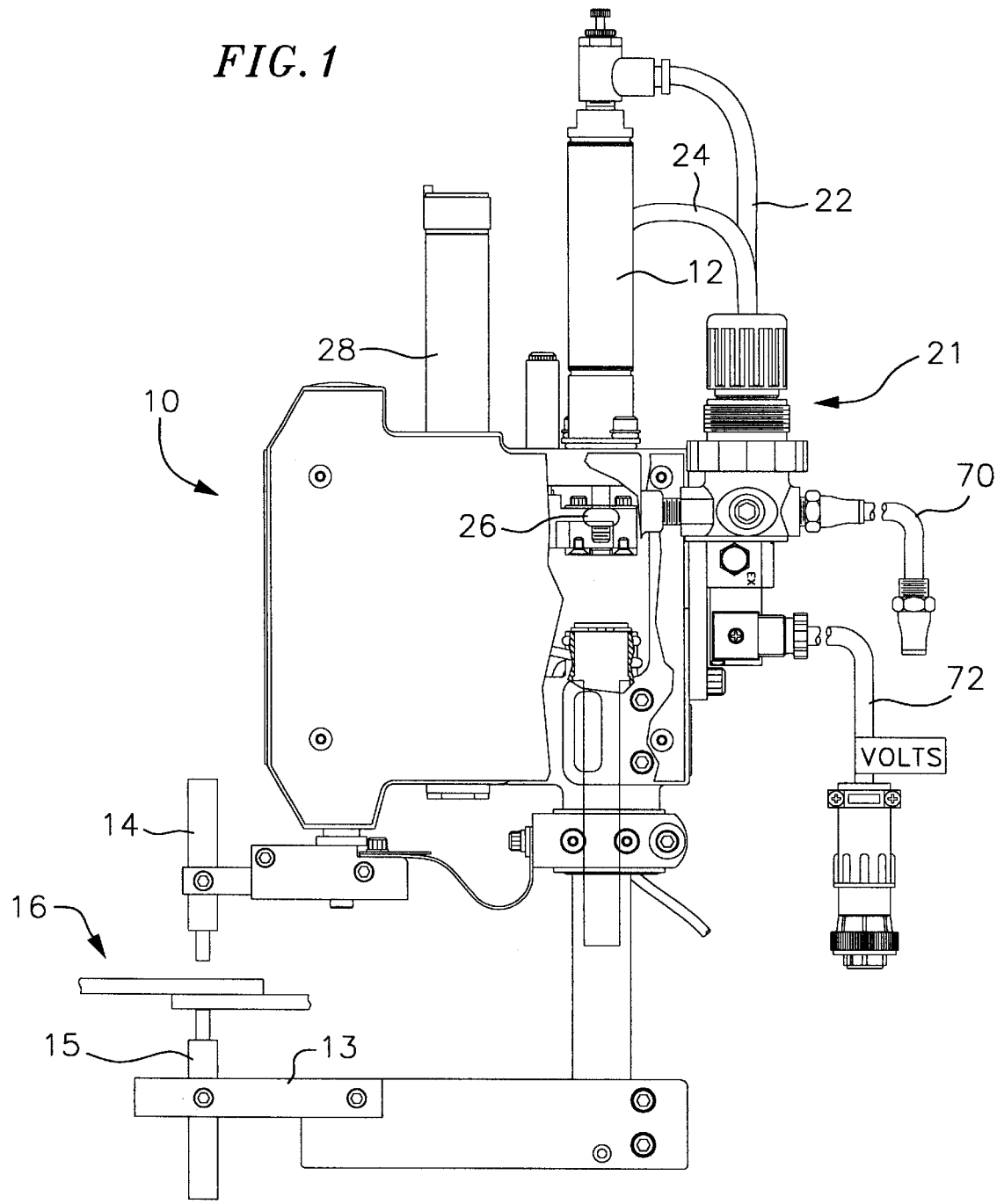
FIG. 1 is a partially cut-away elevational view of a preferred embodiment of a weld head according to the present invention.

Referring to FIG. 1, an air-actuated resistance weld head 10 (or reflow solder head) according to one embodiment of the invention includes an air cylinder 12 which indirectly exerts force on an electrode 14, thereby controlling movement of the electrode and the force of the electrode on a workpiece 16. The workpiece 16 may be welded or reflow soldered on both sides between the electrode 14 and a stationary base electrode 14 on a base 13 of the weld head unit, or only on a top surface of the workpiece 16 with the electrode 14 alone. The weld head or reflow solder head 10 is connected to an air compressor (not shown) by gas line 70 and to a valve power supply 80 (see FIG. 6) by power line 72.

For convenience, hereinafter the terms "weld" and "welding" shall refer to both resistance welding and reflow soldering systems and operations.

The air cylinder 12, shown more clearly in FIG. 2, includes two ports, a down port 17 and an up port 19. A movable piston rod 26 (hereinafter referred to as the "actuating rod") includes a piston head 27 in sealing contact with the inner walls of the air cylinder 12 which forms two air chambers in the cylinder, an upper chamber A above the piston head 27 and a lower chamber B below the piston head 27. A pressure differential between the two air chambers A, B causes the actuating rod 26 to move in the air cylinder 12.

To move the actuating rod 26, the operator controls pressurized air in through one port of the air cylinder 12 and exhausts air through the other port. An up speed flow control valve 18 is attached to the down port 17 and a down speed flow control valve 20 is attached to the up port 19. The flow control valves 18, 20 permit a free flow of pressurized air when inputting air into the air cylinder 12 and restrict air flow to a pre-set degree when exhausting air from the air cylinder. Thus, as the actuating rod 26 moves in the air cylinder 12, the flow control valve exhausting air controls the rate of movement of the rod. Thus, the up speed flow control valve 18 controls the rate at which the actuating rod 26 moves up in the air cylinder and the down speed flow control valve 20 controls the rate at which the actuating rod 26 descends.

Pressurized air from the air compressor is supplied to the air cylinder 12 through a switching valve 21, preferably a 24 volt four-way solenoid valve, which is connected to the down port 18 on the air cylinder via a down air line 22 and the up port 20 by a up air line 24. The switching valve 21 includes a pressure regulator 60 (fixed or adjustable) which is set to control the maximum air pressure in the cylinder in both the down air line 22 and the up air line 24 and hence, the maximum force exerted on the actuating rod 26.

Figure 3A:
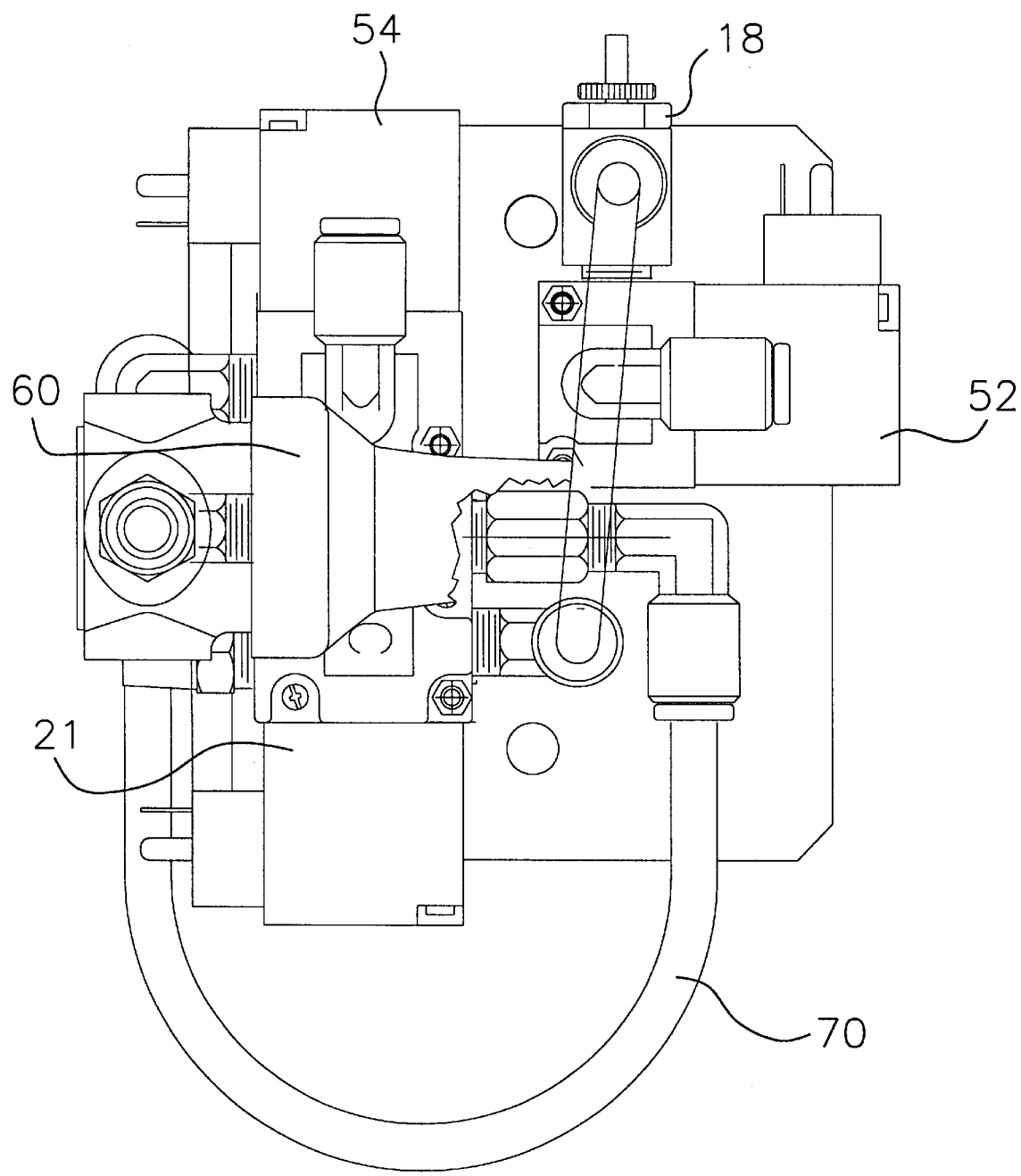
FIG. 3A is a top plan view of an embodiment of a valve system according to the invention.
Figure 3B:
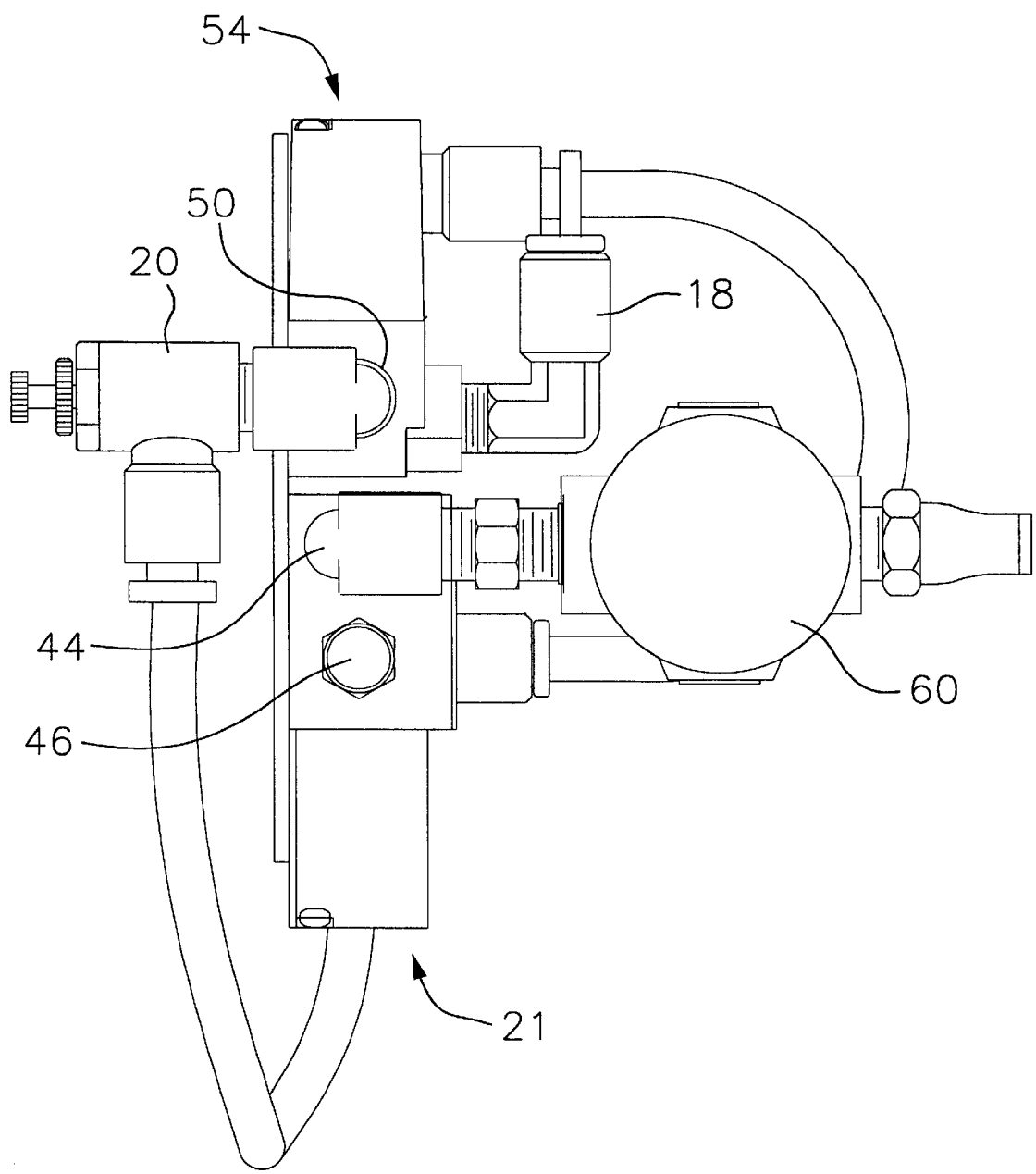
FIG. 3B is a side view of the valve system of FIG. 3A.

FIGS. 3A and 3B illustrate a valve system according to a preferred embodiment of the invention. The switching valve 21 has four ports: an air compressor port 44 for receiving pressurized air from the air compressor, preferably at a pressure between 60 and 100 psi; an exhaust port 46; a port 48 for the down air line 22; and a port 50 for the up air line 24. Pressurized air from the air compressor is set to a relatively high fixed pressure as it passes through regulator 60, preferably a fixed regulator set to about 60 psi, and is routed from the regulator 60 to the air compressor port 44 on the switching valve 21.

Figure 4:
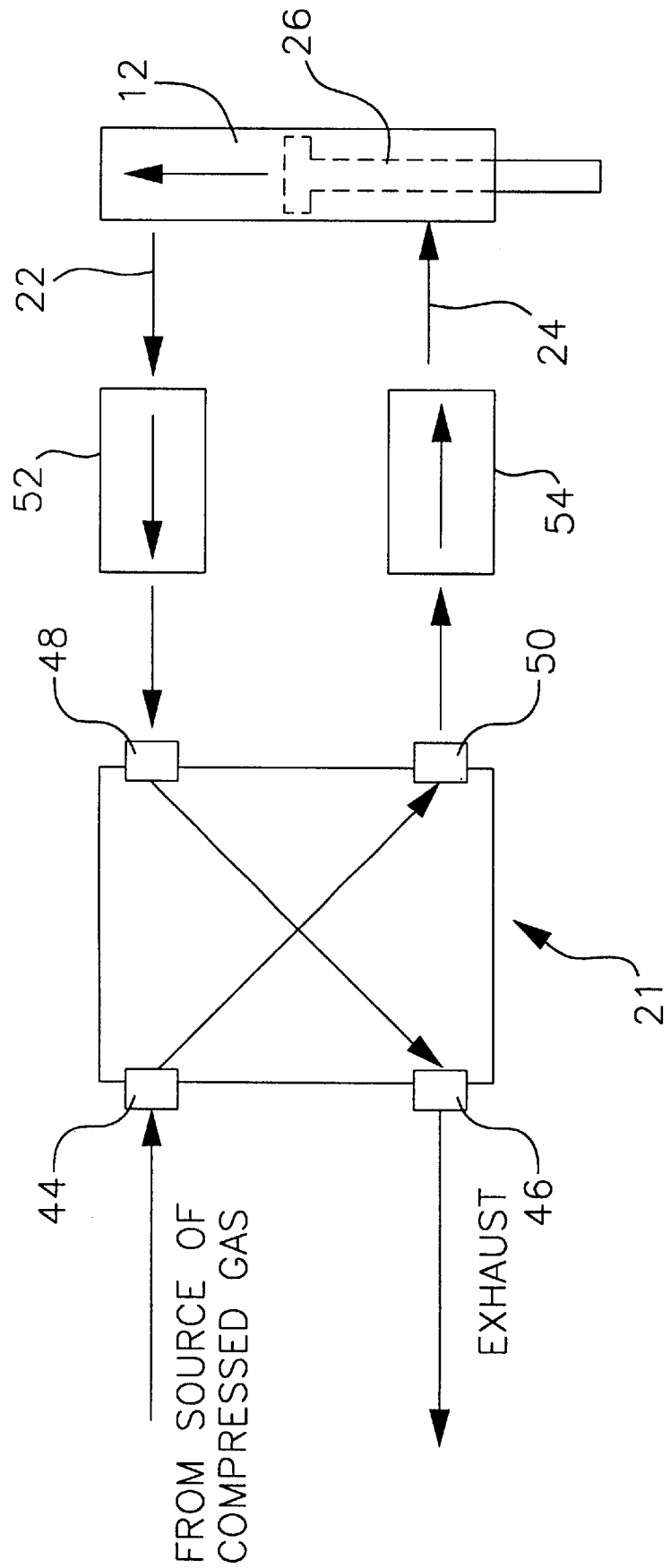
FIG. 4 is a schematic diagram illustrating the flow of pressurized air to the air cylinder during an upstroke of an air cylinder actuating rod.

To raise and lower the actuating rod 26 in the air cylinder 12, the switching valve is controlled by the operator to switch the air input through the air compressor port 44 and exhausted from the exhaust port 46 between the down air line port 48 and the up air line port 50. On the upstroke (see FIG. 4), the switching valve 21 is switched such that the pressurized air flowing into the air compressor port 44 is directed to the up air line port 50 and the pressurized air exhausted from the air cylinder 12 and through the down air line port 48 is directed to the exhaust port 46. This is the state of the switching valve 21 when the weld head is at rest and is also referred to as the "de-energized" state. During the downstroke (see FIG. 5), pressurized air from the air compressor is routed to the down air line port 48 and exhaust from the up air line port 50 is routed to the exhaust port 46. This state is also referred to as the "energized" state.

The embodiment of the valve system illustrated in FIGS. 3A and 3B also includes a two-way valve 52 and a two-way valve 54 incorporated into the up speed air line 22 and down speed air line 24, respectively. According to alternate embodiments, the two-way valves 52, 54 are positioned either between the flow control valves 18, 20 and the air cylinder 12 or between the flow control valves 18, 20 and the air line ports 48, 50 on the switching valve 21. The operation of these two-way valves according to the presently preferred embodiment is described in detail below.

Figure 6:
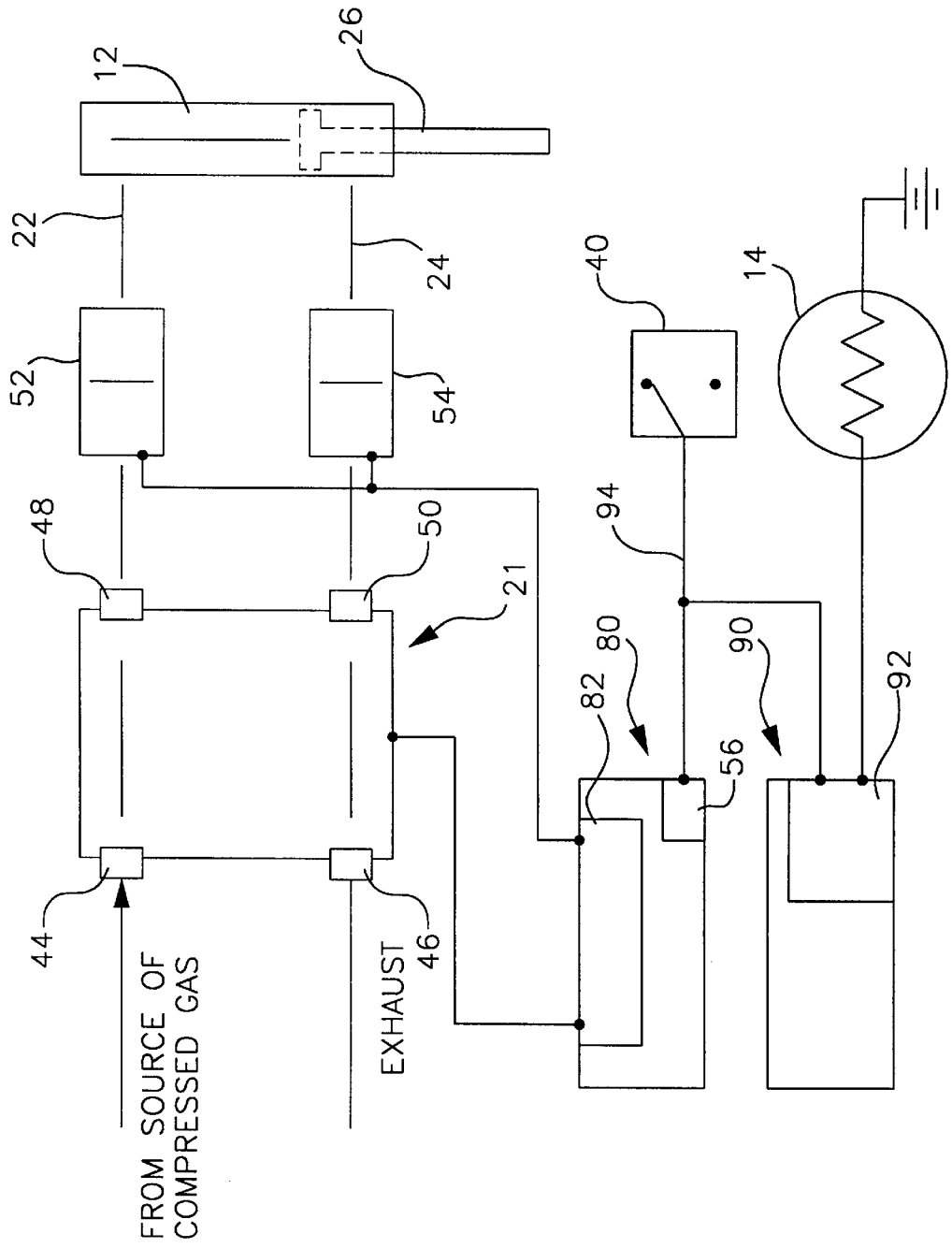
FIG. 6 is a schematic diagram illustrating the flow of pressurized air to the air cylinder during welding.

Referring now to FIG. 6, the valve system, including switching valve 21 and the two-way valves 52, 54, are electrically connected to and controlled by a valve power supply 80 which includes a microcontroller 82 for controlling the states of the various valves. The microcontroller 82 is operator controlled, preferably by a foot pedal (not shown), to switch the routing of pressurized air through the switching valve 21 in order to raise and lower the actuating rod 26 in the air cylinder 12.

Figure 7:
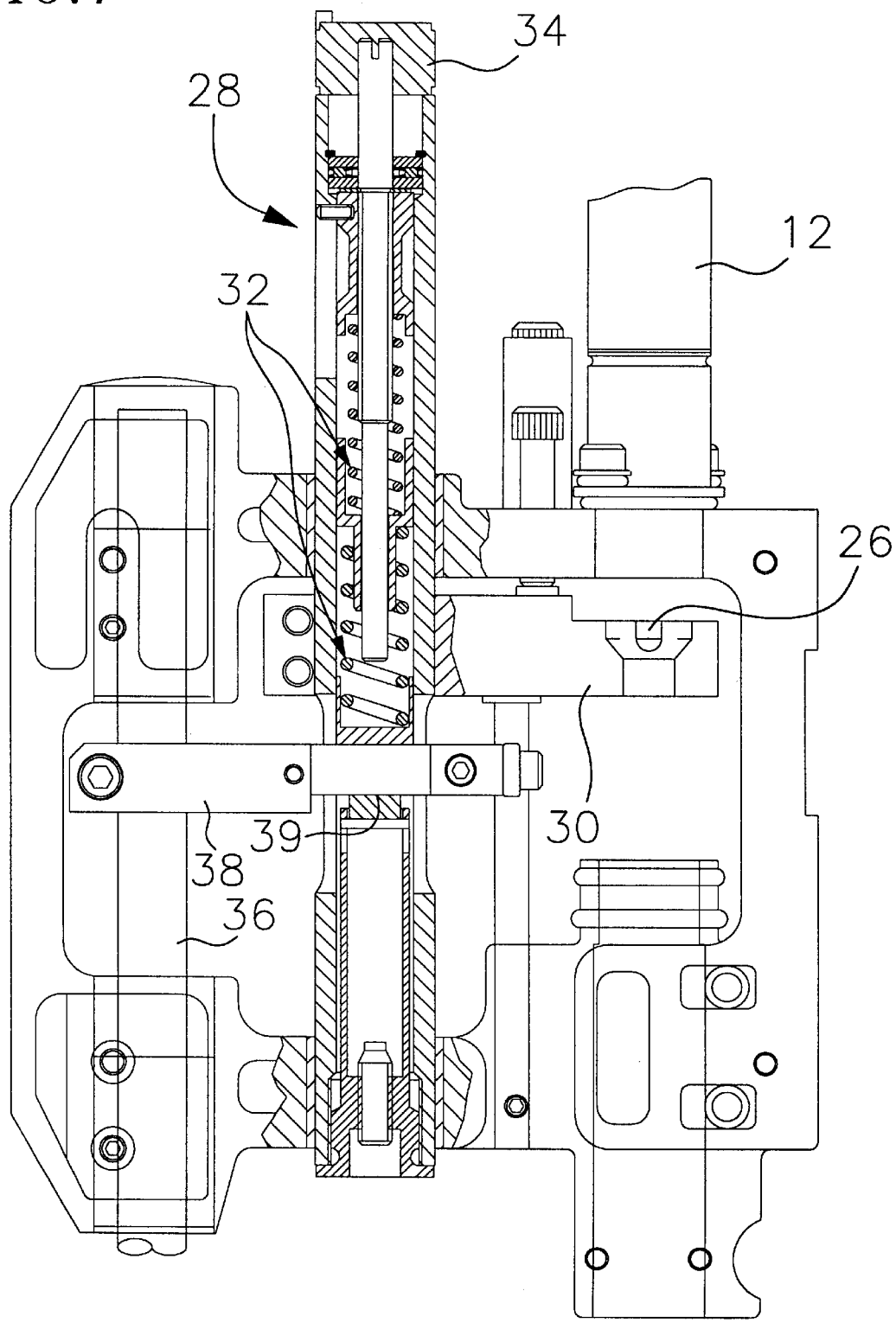
FIG. 7 is a partial cross sectional and partial cutaway view of the weld head shown in FIG. 1, including a cross-sectional view of a spring tube.

As shown in FIG. 7, the air cylinder actuating rod 26 is connected to a spring tube 28 by a spring tube arm 30 such that the spring tube moves up and down with the air cylinder actuating rod 26. The spring tube houses one or more springs 32. The springs 32 may be precompressed to a desired precompression force setting by means of a threaded adjustment knob 34 housed in a threaded bore at the top of the spring tube 28.

The electrode 14 is mounted to an electrode rod 36. The electrode rod 36 is connected to the spring tube 28 by an electrode rod arm 38. The electrode rod arm 38 is positioned in the spring tube 28 directly under the springs 32. When compressed, the springs 32 press the electrode rod arm 38 against a stop 39 positioned below the electrode rod arm 38. The electrode rod arm 38 moves with the spring tube arm 30 during most of the welding operation, but is not rigidly attached to it such that it has some free play. Accordingly, in the welding position, the electrode rod arm 38 can move relative to the spring tube 28 by pressing up on the springs 32 when the downwardly directed precompression force in the springs is overcome by a normal force exerted by the workpiece 16 on the electrode 14.

In operation, the electrode 14 in an up stop position (see FIG. 1) is lowered onto the workpiece 16 by controlling the air cylinder 12 to lower actuating rod 26, which in turn lowers the spring tube 28, and the electrode rod 36 with the electrode 14 onto the workpiece 16. Even after the electrode 14 contacts the workpiece 16, the air cylinder 12 continues to exert downward force on the spring tube 28, thereby causing the electrode 14 to press onto the workpiece 16 with increasingly greater force. During this phase, the workpiece 16 exerts an upward force component on the electrode 14 which approaches the downwardly directed precompression force exerted by the springs 32 in the spring tube 28 on the electrode arm 38. During this phase the spring tube 28 and the electrode rod arm 38 remain essentially stationary. At the point when an upward force component of the force exerted onto the electrode by the workpiece overcomes the precompression force in the springs 32, the springs begins to further compress. During this phase, the spring tube 28 continues descending, while the electrode rod arm 38 remains essentially stationary.

Figure 8:
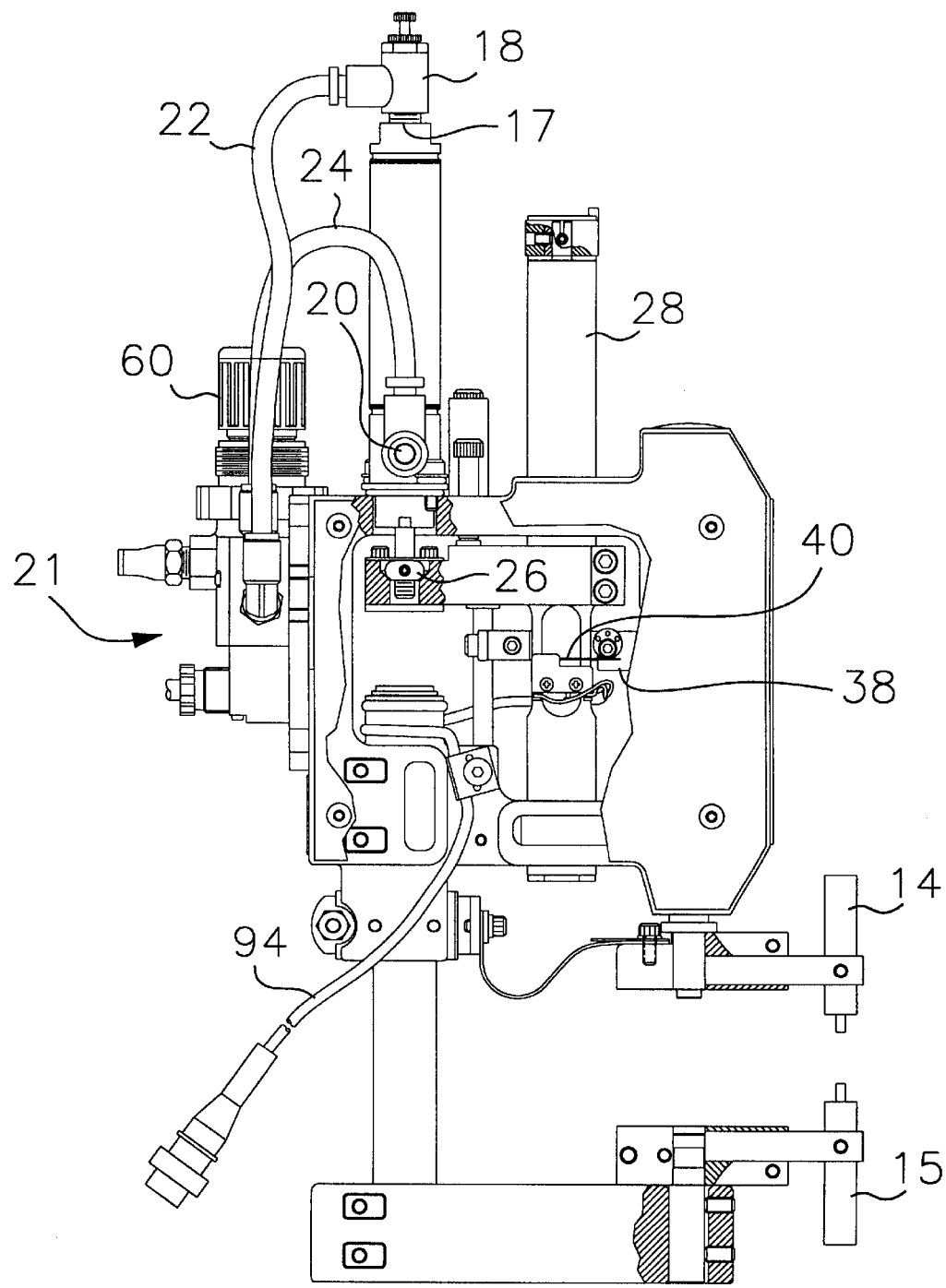
FIG. 8 is a partial cross sectional and partial cutaway view of the weld head shown in FIG. 1, including a view of a force firing switch.

A force firing switch 40, shown in FIG. 8, is mounted on the spring tube 28 and is sensitive to the downward movement of the spring tube 28 with respect to the electrode rod arm 38. The force firing switch 40 activates when the springs 32 compress and the spring tube moves a certain distance with respect to the electrode rod arm 38, typically about 1/16 inch. The springs 32 are set to a precompression force slightly below the desired weld force such that when the desired weld force is attained, the force firing switch 40 activates.

Referring now to FIG. 6, the electrode 14 is electrically connected to and controlled by a welding power supply 90 which includes a microcontroller 92 for controlling the supply of electrical energy to the electrode 14 to initiate welding. The microcontroller 92 is connected to the force firing switch 40 via a cable 94 (FIG. 8) and is sensitive to the state of the force firing switch 40. When activated, the force firing switch 40 signals the welding power supply 90 to supply electrical current to the electrode 14, thereby energizing the electrode 14 to begin welding. The welding power supply microcontroller 92 de-energizes the electrode 14 when the welding is completed. This must be prior to the operator lifting the electrode off of the workpiece to avoid a blown weld. As the upward force exerted by the workpiece 16 on the electrode 14 is reduced, the springs 32 re-expand to their original (precompressed) length. Consequently, the force firing switch 40 deactivates.

To set the desired weld force, the operator precompresses the springs 32 with the spring adjusting knob 34 so that the springs 32 exert a downward force on the electrode rod arm 38 with a force slightly less than the desired weld force. As described above, when the upward component of the force exerted by the workpiece exceeds the downwardly directed spring precompression force exerted on the electrode 14 via the electrode rod arm 38, the springs 32 begin to further compress and the spring tube 28 to move relative to the electrode rod arm 38. The force firing switch 40 activates when the desired weld force is attained between the electrode 14 and the workpiece 16.

When the desired weld force is attained (and the force firing switch activates), it is necessary to maintain a constant force exerted by the air cylinder 12 on the spring tube 28 which is accomplished according to a preferred embodiment of the invention. Referring now to FIG. 6, in a presently preferred embodiment, the valve power supply 80 includes a sensor 56 electrically connected to force firing switch, e.g., by cable 94 (FIG. 8). The sensor is sensitive to the state of the force firing switch 40. The two-way valves 52, 54 are electronically controlled to be in an open or a closed state by the microcontroller 82 in response to the state of the force firing switch 40. As illustrated in the diagram of FIG. 6, when the force firing switch 40 is activated, the microcontroller 82 controls both two-way valves 52, 54 to close. Consequently, the pressure in the both chambers A, B of the air cylinder remains essentially constant, thereby maintaining a constant force exerted by the air cylinder actuating rod 26. With this constant force maintained in the actuating rod 26, the force of the electrode 14 on the workpiece 16 remains constant by way of the electrode rod, the electrode rod arm, and spring tube springs and the spring tube arm. During welding, the spring force in the springs 32 causes the electrode rod arm 38 and associated electrode 14 to move down to compensate for any deformation in the workpiece 16 due to the weld process.

In one embodiment, the valve power supply 80 and the welding power supply 90, and their various components, are incorporated into a single unit. In an alternate embodiment, the valve system, such as that of the embodiment of FIGS. 3A and 3B, and the valve power supply 80 are provided as a kit to replace known switching valves and valve power supplies.

Figure 5:
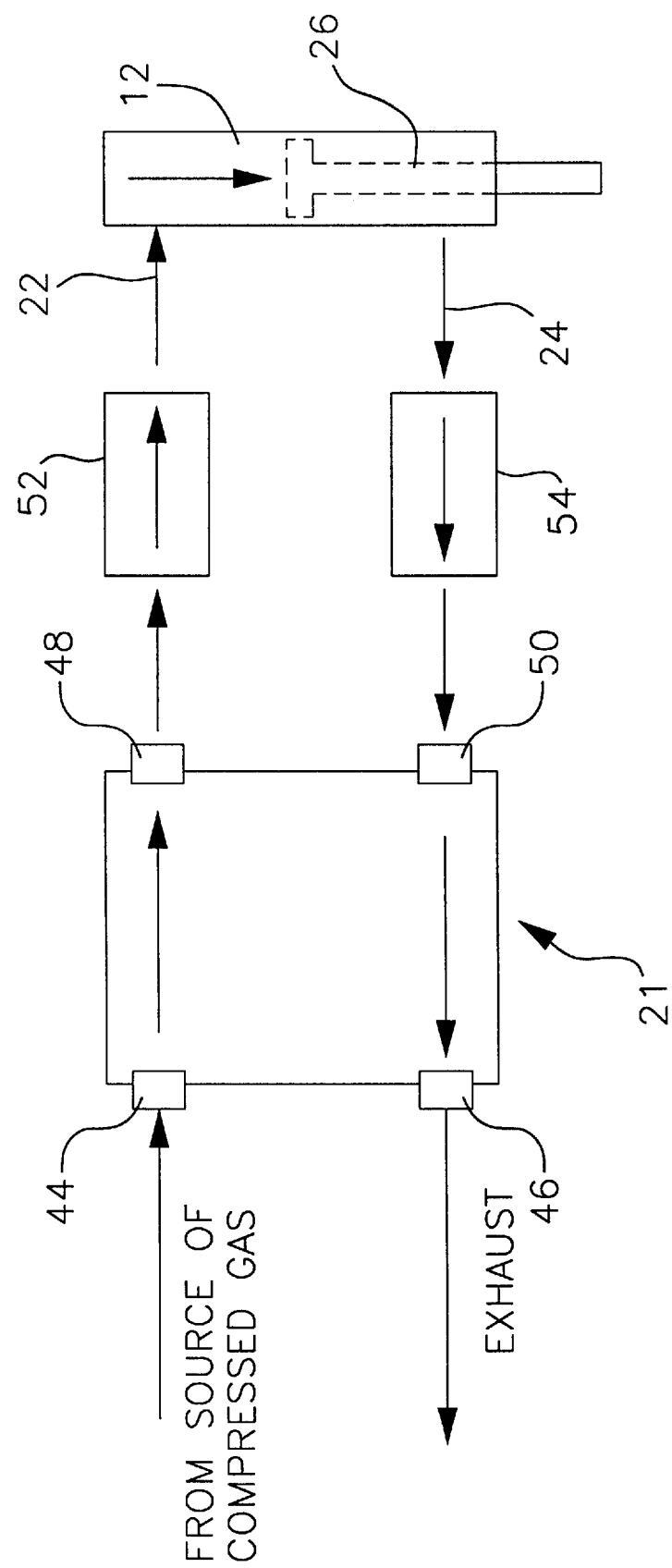
FIG. 5 is a schematic diagram illustrating the flow of pressurized air to the air cylinder during a downstroke of an air cylinder actuating rod.

To operate a weld head according to one embodiment of the invention, the operator first presets the spring tube springs 32 to the desired weld force setting. From the up stop, or de-energized position (see FIG. 1), the operator commands microcontroller 82 to control the switching valve 21 to route compressed air from the air compressor port 44 through the down air line port 48 and exhausted air from the up air line port 50 through the exhaust port 46, as shown in FIG. 5, thereby forcing the actuating rod 26 down, which in turn lowers the electrode 14 onto the workpiece 16. After the electrode 14 contacts the workpiece 16, the air cylinder 12 continues exerting force on the actuating rod 26 and indirectly on the electrode 14 through the spring tube arm 30, spring tube spring 32, electrode rod arm 38, and electrode rod 36. Due to the upward, normal force exerted by the workpiece 16 onto the electrode 14, the electrode rod arm 38 begins to exert upward pressure on the precompressed springs 32. When the force exerted on the springs 32 exceeds the precompression (downward) force stored in the springs 32, the springs begin to further compress. This slight increased compression triggers the force firing switch 40 when the desired weld force is attained. Upon activation of the force firing switch, sensor 56 signals the valve power supply microcontroller 82 to control two-way valves 52, 54 to close, as shown in FIG. 6, thereby maintaining an essentially constant pressure in both chambers A, B of the air cylinder 12, and consequently maintaining the desired weld force between the electrode 14 and the workpiece 16.

When welding is complete, the welding power supply microcontroller 92 de-energized the electrode 14. When the operator de-energizes the valve power supply, e.g., by releasing the foot pedal, the valve power supply microcontroller 82 simultaneously opens the two-way valves 52, 54 and controls the switching valve 21 to route compressed air from the air compressor port 44 through the up air line port 50 and exhausted air from the down air line port 48 through the exhaust port 46 (see FIG. 4), thereby forcing the actuating rod 26 up, which in turn lifts the electrode 14 off of the workpiece 16. The force firing switch 40 deactivates once the desired weld force is lost.

Figure 9:
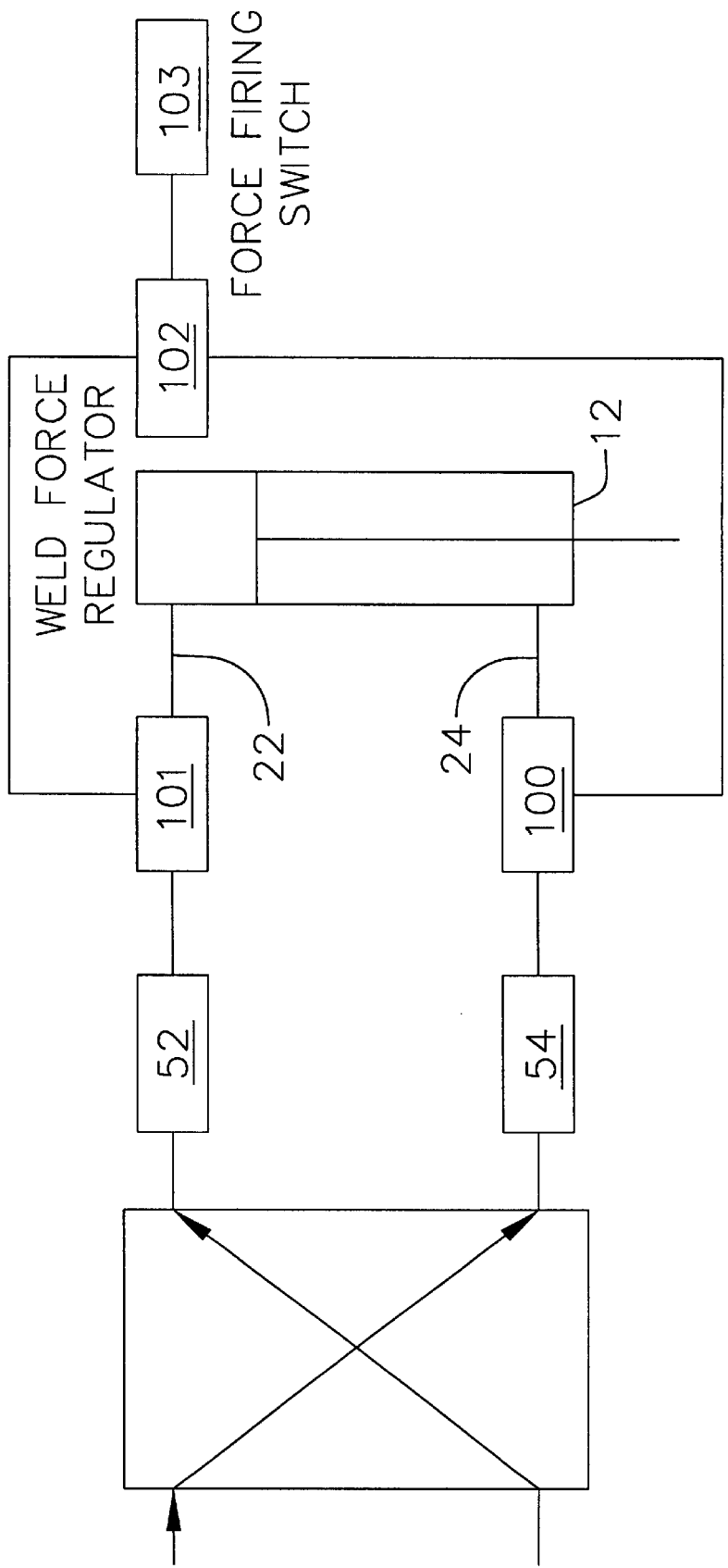
FIG. 9 is a schematic diagram illustrating an alternate embodiment of the present invention wherein the weld force is indirectly determined by measuring the pressure in the upper and lower chambers of the cylinder.

Referring to FIG. 9, in an alternate embodiment of the present invention, the applied weld force is indirectly sensed by measuring the pressures in the upper and lower chambers of the air cylinder 12. In this embodiment, a pressure sensor 100 is fluidically coupled to the up port 20 of the air cylinder 12 via the up air line 24. Also, a pressure sensor 101 is fluidically coupled to the down port 20 of the air cylinder 12 via the down air line 22. Preferably, the pressure sensors are pressure transducers or switches with voltage output which corresponds to the measured pressure. The applied weld force is then determined by the following equation.

$$F_s = Pa = P_U A_U - P_L A_L$$

Where $P_U$ is the pressure in the upper chamber $A_U$ is the area of the circular cylinder plunger $P_L$ is the pressure in the lower chamber $A_L$ is the area of the circular cylinder plunger minus the area of the cylinder rod In operation pressurized air from the air compressor is supplied to the air cylinder 12 through a switching valve 21, which is connected to the down port 18 of the air cylinder via a down air line 22 and the up port 20 by an up air line 24. This alternate embodiment includes a weld force regulator 102 which is in electrical communication with the upper and lower pressure sensors 100, 101. The weld force regulator 102 continuously compares the output of the upper and lower pressure sensors 100, 101 with the values required to achieve a desired weld force. The weld force regulator 102 is a microcontroller or other digital circuitry known to those skilled in the art. The output of the weld force regulator 102 is in electrical communication with a force firing switch 103. The weld force regulator commands the force firing switch 103 to change states when the desired pressure ratios (i.e. predetermined weld force) is achieved. An electro-mechanical switch or relay, or solid-state devices which close or switch to an active state in accordance with variations in the input, i.e voltage level, can be used as the force firing switch 103. The force firing switch 103 is used to electronically communicate with the microcontroller 82 in an identical fashion as the force firing switch 40 of the preferred embodiment. Thus, the microcontroller, in response to the state of the force firing switch 103, would trigger the supply of electrical current to the electrode 14 and open and close the two way 52, 54 trapping valves. When the electrode 14 is lifted off the workpiece 16, the force firing sensor 103 deactivates.

Figure 10:
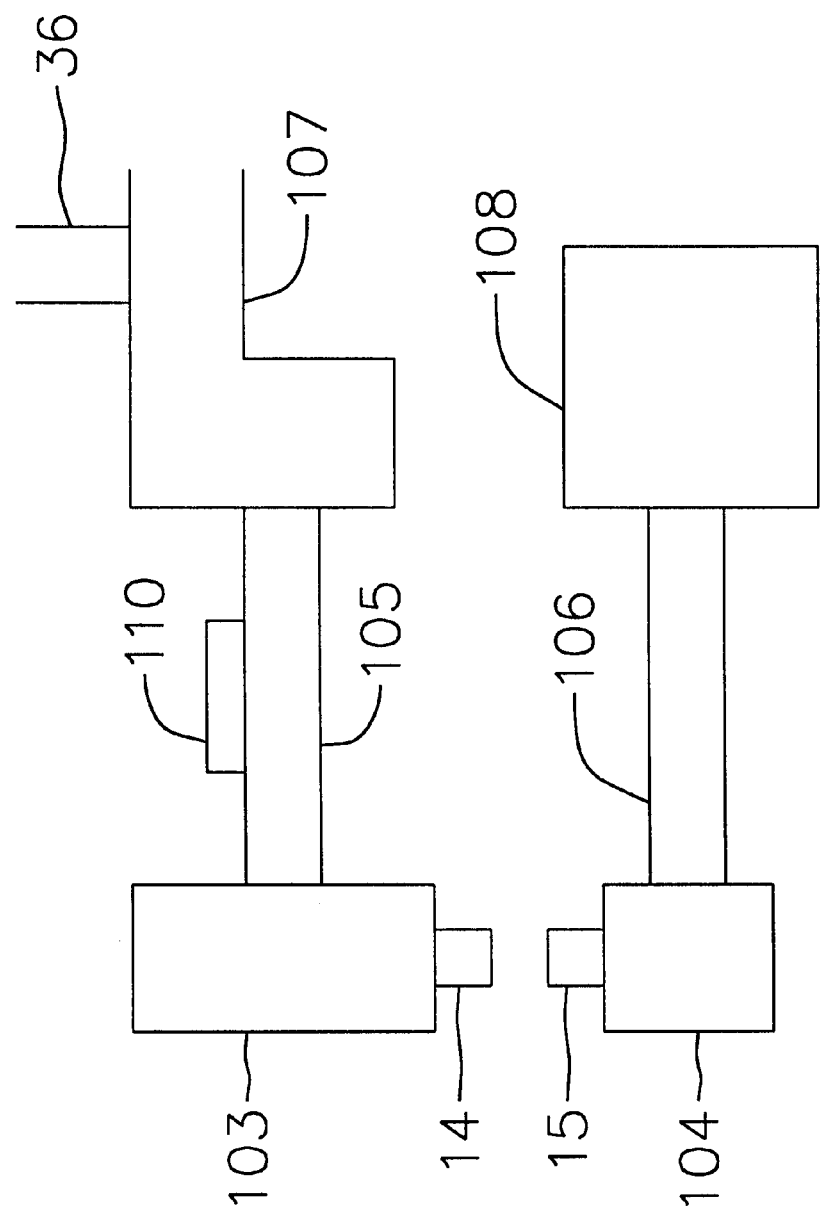
FIG. 10 is a schematic diagram illustrating an alternate embodiment of the present invention wherein the weld force is indirectly determined by strain gauge measurements on an offset electrode holder.

Referring to FIG. 10, in another alternate embodiment of the present invention, a strain gauge, as is known in the art, is used to measure the plastic bending of support members operably coupled to the electrode rod 36 in an offset holder. In this alternate embodiment the upper and lower electrodes 14, 15 are operably mounted to upper and lower electrode holders 103, 104 respectively. Upper and lower electrode holder bars 105, 106 are in cantilever connection with the upper and lower electrode holders 103, 104 and the upper and lower electrode holder adapter blocks 107, 108. The electrode rod 36 is operably coupled to the upper electrode holder adapter block 107. A strain gauge 110 is operably coupled to either the upper or the lower electrode holder bar 105, 106 for measuring the applied weld force.

In operation, the electrode 14 is lowered onto the workpiece 16 by controlling the air cylinder 12 to lower the actuating rod 26 which in turn lowers the electrode rod 36, the upper electrode holder adapter block 107, the upper electrode holder bar 105, and the upper electrode holder 103 with the upper electrode 14 onto the workpiece. After the upper electrode 14 contacts the workpiece 16 the air cylinder 12 continues to exert downward force on the electrode rod 36, thereby causing the upper and lower electrode holder bars 105, 106 to elastically bend as the upper electrode 14 presses onto the workpiece 16 with increasingly greater force. The elastic bending of the upper and lower electrode holder bars 105, 106 is measured as a surface strain by a strain gauge 110. The strain gauge outputs a voltage which, as is known in the arts, is proportional to the amount of force exerted on the workpiece 16. The output of the strain gauge 110 provides one of two inputs into a force comparator 111. The second input is provided by a force program. The force program is a preprogrammed or user controlled means of producing a voltage level which represents the optimum force to be applied by the welding apparatus on to the workpiece. The function of the comparator is to continuously compare the two inputs and change state when the inputs are equal.

The output of the force comparator 111 is then electrically connected to a force firing switch 112. An electro-mechanical switch or relay, or solid-state devices which close or switch to an active state in accordance with variations in the input, i.e voltage level, could be used as the force firing switch 112. The force firing switch 112 is used to electronically communicate with the microcontroller 82 in an identical fashion as the force firing switch 40 of the preferred embodiment. Thus, the microcontroller 82, in response to the state of the force firing switch 112, would trigger the supply of electrical current to the electrode 14 and open and close the two way 52, 54 trapping valves. When the electrode 14 is lifted off the workpiece 16, the load on the strain gauge 110 is relaxed, it's output goes to zero thereby deactivating the force firing switch 112.

Figure 11:
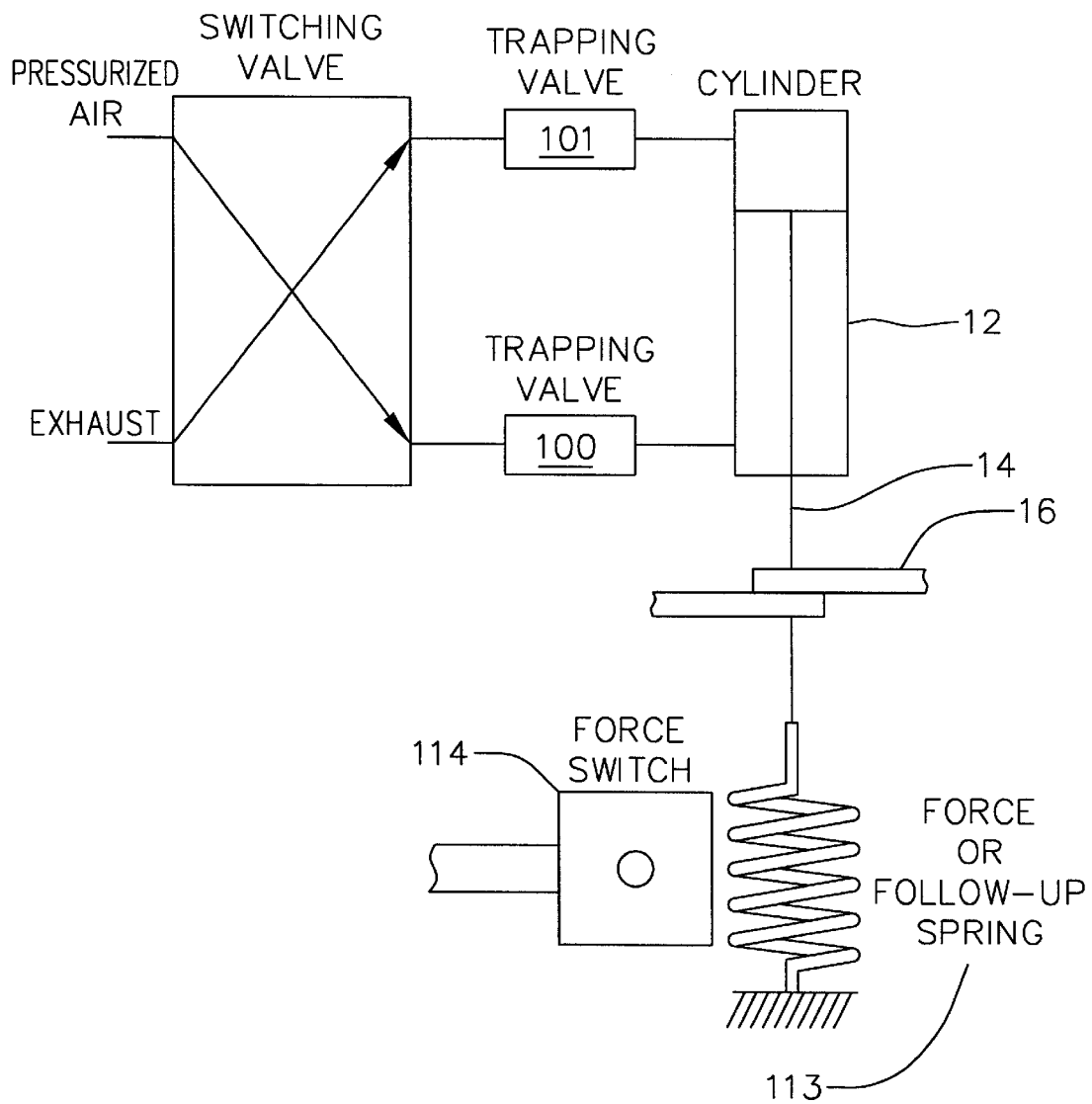
FIG. 11 is a schematic diagram illustrating an alternate embodiment of the present invention wherein the weld force is determined by measuring the force applied to the workpiece.

Referring to FIG. 11, in another alternate embodiment the means for sensing the weld force between the electrode 14 and the workpiece 16 are coupled to the workpiece 16 rather than the upper or lower electrodes 14, 15. In this embodiment the workpiece is coupled to a force setting spring 113 which activates a force firing switch 114 when a predetermined weld force is sensed on the workpiece 16. An electro-mechanical switch, relay, or solid-state devices which close or switch to an active state in accordance with variations in the input, i.e voltage level, can be used as the force firing switch 114. Force measurement springs, as known in the art have long been used in simple weighing devices. Here, the system would operate much like a balance, when a predetermined weld force is exerted on the workpiece 16 the force setting spring 110, compresses a predetermined distance based upon its spring constant. The force firing switch 114 is sensitive to the force setting spring compression, and changes state when a predetermined spring compression (or weld force) is achieved.

Alternatively, the actual distance the force setting spring 113 is compressed could be monitored with photo diodes or other electro-optical measurement devices known in the art. This measurement would then supply one of the inputs to a comparator which would function as the force switch 114. The second input would be a predetermined compression distance which corresponds to the desired weld force. The comparator continuously compares the two inputs and change state when the inputs are equal, thus when a predetermined weld force is achieved. Digital circuitry for carrying out the required processes as described are well known to those skilled in the art.

The force firing switch 114, electronically communicates via cable, with the microcontroller 82 in an identical fashion as the force firing switch 40 of the preferred embodiment. Thus, the microcontroller 82, in response to the state of the force firing switch 114, would trigger the supply of electrical current to the electrode 14 and open and close the two way 52, 54 trapping valves. Again, when the electrode 14 is lifted off the workpiece 16, the load on the force setting springs is reduced and the force firing switch 114 deactivates.

Figure 12:
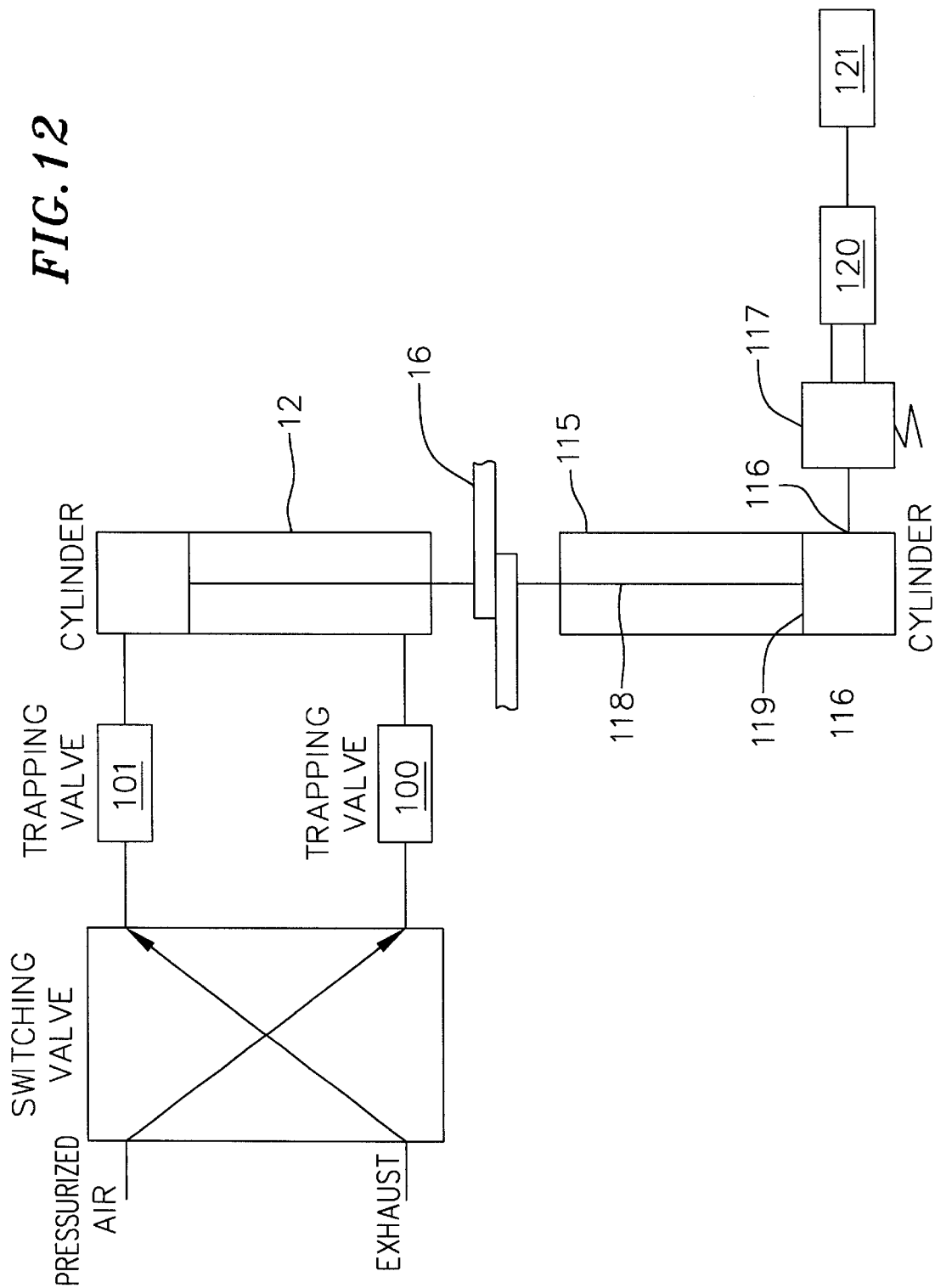
FIG. 12 is a schematic diagram illustrating an alternate embodiment of the present invention wherein the weld force is indirectly determined by measuring the force exerted on the lower electrode.

Referring to FIG. 12, in another alternate embodiment an air cylinder 115 is operably coupled to the lower electrode 15. The air cylinder 115 includes a single down port 116 which is operably coupled to a pressure sensor 117, preferably a pressure transducer, for sensing the weld force between the electrode and the workpiece. A piston rod 118 (hereinafter referred to as the "actuating rod") includes a piston head 119 in sealing contact with the inner walls of the air cylinder to form an upper air chamber above the piston head 119 and a lower air chamber below the piston head 119. A force applied to the workpiece 16 exerts a force on the actuating rod 118, increasing the pressure in the lower chamber of the air cylinder 115. The output of the pressure sensor 117 provides one of two inputs into a force comparator 120. The second input is provided by a force program. The force program, is a preprogrammed or user controlled means of producing a voltage level which represents the optimum force to be applied by the welding apparatus on to the workpiece. The function of the comparator is to continuously compare the two inputs and change state when the inputs are equal.

The output of the force comparator 120 is then electrically connected to a force firing switch 121. An electromechanical switch or relay, or solid-state devices which close or switch to an active state in accordance with variations in the input, i.e voltage level, can be used as the force firing switch 121. The force firing switch 121 is used to electronically communicate with the microcontroller 82 in an identical fashion as the force firing switch 40 of the preferred embodiment. Thus, the microcontroller, in response to the state of the force firing switch 121, would trigger the supply of electrical current to the electrode 14 and open and close the two way 52, 54 trapping valves. When the electrode 14 is lifted off the workpiece 16, the force applied to the actuating rod 118 is relaxed deactivating the force firing switch 121.

Figure 13:
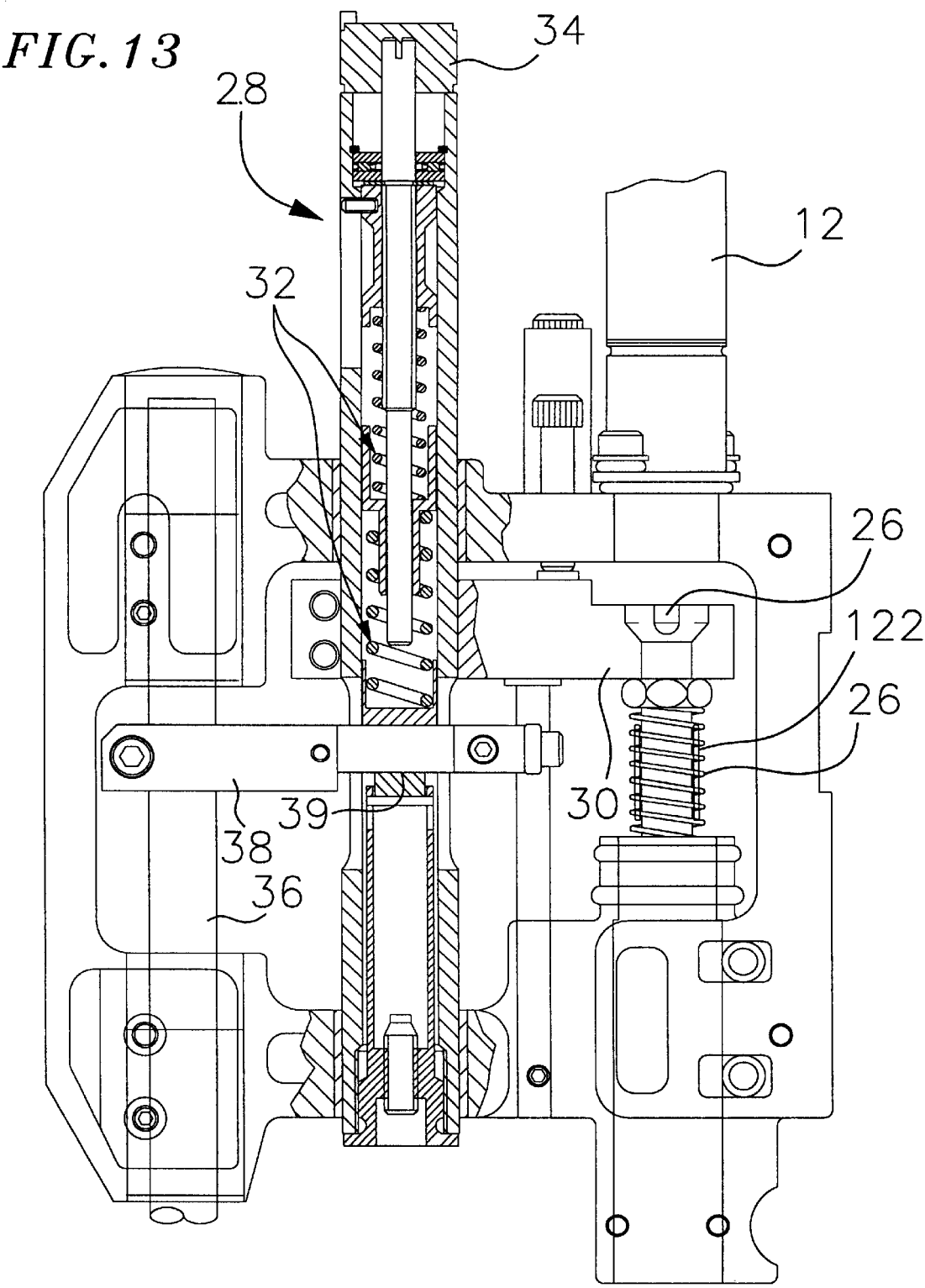
FIG. 13 is a schematic diagram illustrating an alternate embodiment of the present invention wherein the weld force is maintained by applying a brake to the air cylinder actuating rod when a predetermined weld force has been sensed.

Referring to FIG. 13, a constant weld force exerted by the air cylinder 12 on the spring tube 28 is accomplished according to an alternate embodiment of the present invention. In this alternate embodiment, a brake mechanism 122 or clutch, is operably coupled to the air cylinder actuating rod 26. The brake mechanism 122 is electronically controlled to be in an open or a closed position by the microcontroller 82 in response to the state of the force firing switch 40. When the desired weld force is attained, the force firing switch 40 is activated and the microcontroller 82 commands the brake mechanism 122 to close, locking the air cylinder actuating rod 26 in a fixed position. Therefore, the force exerted by the air cylinder actuating rod 26 as well as the force of the electrode 14 on the workpiece 16 is held constant. During welding the spring force in the springs 32 causes the electrode rod arm 38 and associated electrode 14 to move down to compensate for any deformation in the workpiece 16 due to the weld process. It will be recognized by those skilled in the art that the brake mechanism 122 could readily be coupled to the spring tube arm 30 or the spring tube 28 to maintain the desired constant force.

Figure 14:
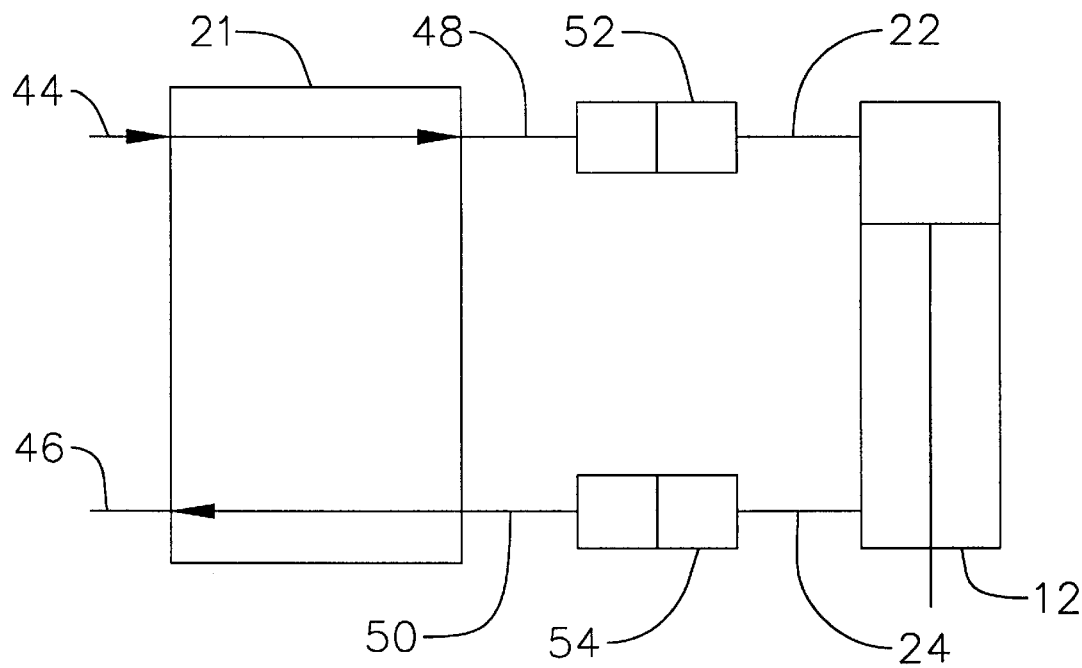
FIG. 14 is a schematic diagram illustrating the flow of pressurized air to the air cylinder at completion of welding.
Figure 16:
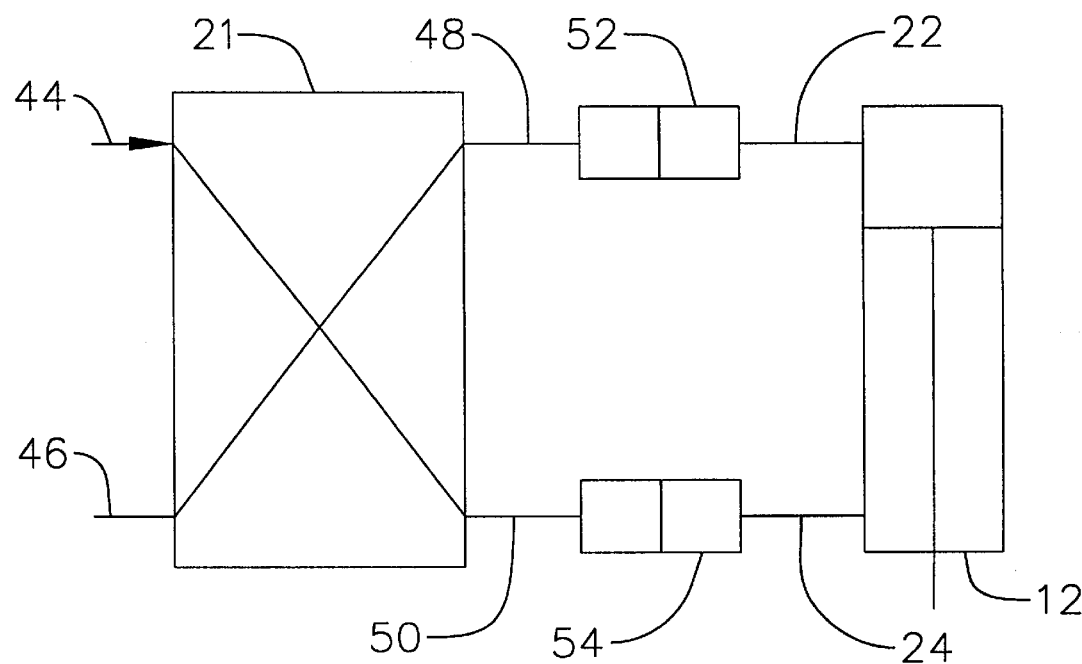
FIG. 16 is a schematic diagram illustrating the flow of pressurized air to the air cylinder at the completion of welding but prior to opening the two way valves.
Figure 15:
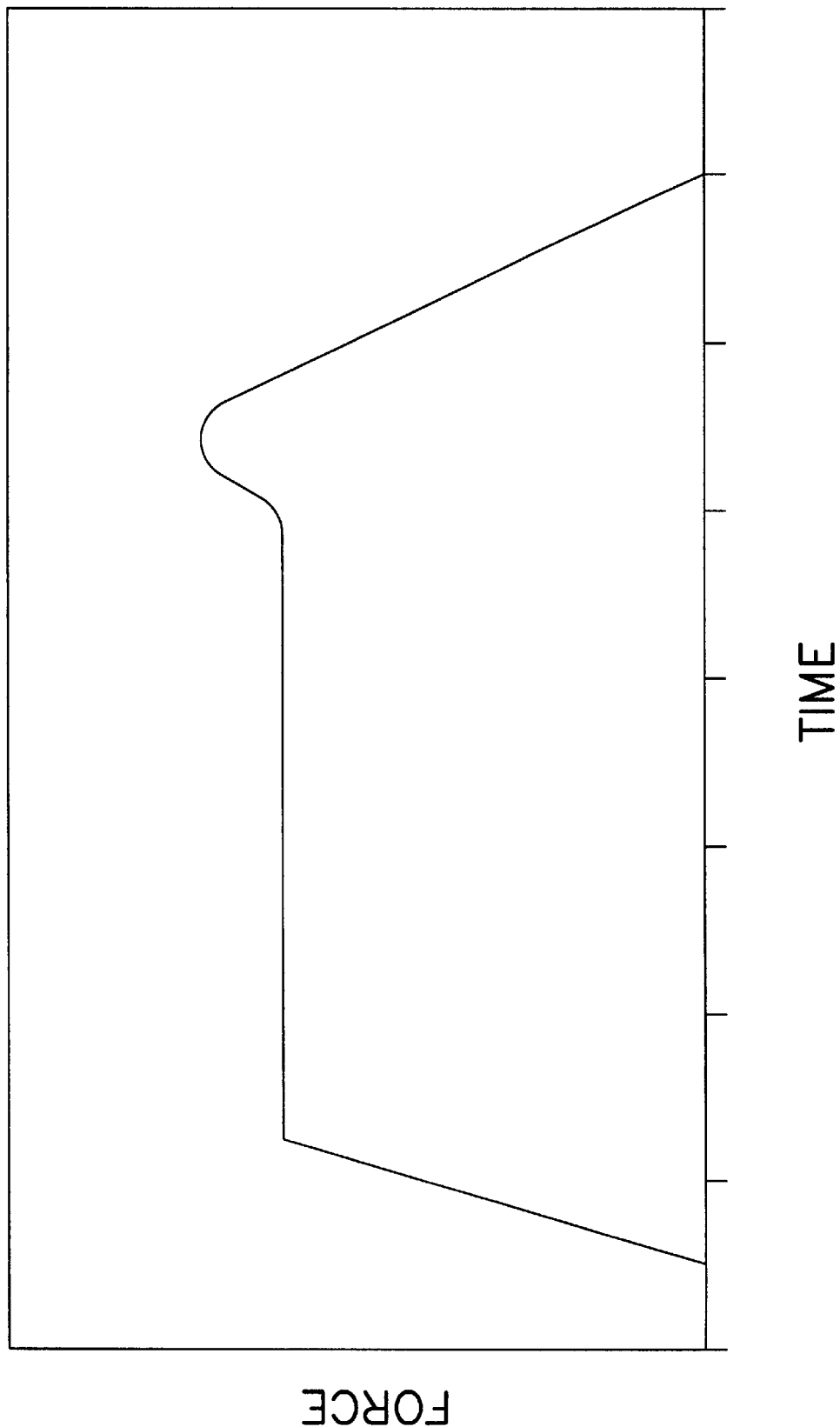
FIG. 15 is a graph displaying the weld force as a function of time which demonstrates the application of a weld force which exceeds the predetermined level if the microcontroller first opens the two-way valves when the switching valve is in the energized state.

In a further alternate embodiment, the valve power supply microcontroller 82 is programmed to optimize the sequencing of the switching valve 21 and the two way valves 53, 54 at the completion of the welding operation. This embodiment prevents the inadvertent application of excessive force by the electrode 14 upon the workpiece 16 after the electrode 14 has been de-energized. If the microcontroller 82 first opens the two-way valves 52, 54 when the switching valve 21 is in the energized state, (i.e. pressurized air from the air compressor is routed to the down air line port 48 and exhaust from the up air line port 50 is routed to the exhaust port 46) as shown in FIG. 14 the pressure in the air cylinder 12 is increased when the two way valves 52, 54 are opened . As shown in FIG. 15 this increase in air cylinder 12 pressure corresponds to a spike in the applied weld force between the electrode 14 and the workpiece 16. Therefore, in this alternate embodiment, when the operator de-energizes the valve power supply, e.g., by releasing the foot pedal, the valve power supply microcontroller 82 first controls the switching valve 21 to route compressed air from the air compressor port 44 through the up air line port 50 and exhausted air from the down air line port 48 through the exhaust port 46 (see FIG. 16). Next the microcontroller pauses approximately 100–125 msec before opening the two-way valves 52, 54. This alternate embodiment ensures that the direction of airflow moves the electrode 14 away from the workpiece 16 after completion of the welding process.

Although a preferred embodiment of the present invention has been described, it should not be construed to limit the scope of the invention. In the preferred embodiment, the pressure regulator system includes a weld force sensor incorporated in the weld head for determining when a predetermined weld force has been attained. Those skilled in the art will understand that various modifications may be made to the described weld force sensor for monitoring the in-line force between the electrode rod 36, the upper electrode 14 the workpiece 16 and the lower electrode 15 than those disclosed in the preferred embodiment. Alternate embodiments of the weld force sensor include electro-optic switches, electro-mechanical switches or magneto-electric switches which are sensitive to the compression or elongation of a force setting spring. In addition, load cells or force transducers can also be used to measure the in line force between the electrode rod 36, the upper electrode 14 the workpiece 16 and the lower electrode 15. Those skilled in the art will recognize that the force setting spring may be operably coupled to the upper electrode rod 36, the upper electrode 14 or the lower electrode 15. In addition, photo diodes or other electro-optical measurement devices known in the art could be utilized to measure the actual compression or elongation of a force setting spring.

What is claimed is:

1. A weld head for welding a workpiece comprising:
   an electrode;
   a cylinder comprising an actuating rod operatively connected to the electrode for pressing the electrode onto the workpiece responsive to a flow of pressurized fluid in the cylinder;
   a force sensing mechanism for sensing when a predetermined weld force between the electrode and workpiece is reached; and
   one or more valves responsive to the sensor for blocking fluid flow to and from the cylinder when the predetermined weld force is sensed and maintaining the predetermined weld force between the electrode and the workpiece while the workpiece is being welded.

2. The weld head of claim 1 wherein the force sensing mechanism comprises:
   a first pressure sensor in fluid communication with an up port of the cylinder;
   a second pressure sensor in fluid communication with a down port of the cylinder;
   a weld force regulator in electrical communication with said first and second pressure sensors for monitoring the pressure in the upper and lower chambers of the cylinder; and
   a force firing switch in electrical communication with the weld force regulator which changes state when a predetermined weld force between the electrode and workpiece is reached.

3. The weld head of claim 1 wherein the force sensing mechanism comprises:
   an adjustment device for setting a predetermined weld force level;
   a force setting spring operatively coupled to the electrode which compresses when the electrode is pressed onto a workpiece;
   a means for measuring the compression of the force setting spring; and
   a force firing switch that changes state when the predetermined weld force is reached.

4. The weld head of claim 3 wherein the means for measuring the compression of the force setting spring is one or more photo diodes.

5. The weld head of claim 1 wherein the force sensing mechanism comprises:
   an adjustment device for setting a predetermined weld force level;
   a force transducer operatively coupled to the electrode, said transducer being adapted to output an electrical signal that corresponds to a given weld force; and
   a force sensor whose output changes state when a predetermined weld force is achieved.

6. The weld head of claim 1 wherein the force sensing mechanism comprises:
   a second cylinder operatively coupled to a lower electrode such that the pressure in a lower chamber of said second cylinder varies as the upper electrode exerts a weld force on the workpiece;
   an adjustment device for inputting the desired pressure level in the lower chamber of the second cylinder; and
   a pressure responsive switch operatively coupled to the lower chamber of the second cylinder which changes state when a predetermined pressure in the lower chamber is reached.

7. The weld head of claim 1 wherein the force sensing mechanism comprises:
   an adjustment device for setting a predetermined weld force level;
   a force setting spring operatively coupled to the workpiece which compresses when the electrode is pressed onto a workpiece;
   a means for measuring the compression of the force setting spring; and
   a force firing sensor that changes state when a predetermined weld force is reached.

8. The weld head of claim 1 wherein the force sensing mechanism comprises:
   an adjustment device for setting a predetermined weld force level;
   a force setting spring operatively coupled to a workpiece which compresses when the electrode is pressed onto a workpiece; and
   a force firing switch operatively coupled to and sensitive to the compression of the force setting spring such that the force firing switch closes when a predetermined weld force is achieved.

9. The weld head of claim 1 wherein the force sensing mechanism comprises:
   an adjustment device for setting a predetermined weld force level;
   a force transducer operatively coupled to the workpiece which outputs an electrical signal which corresponds to a given weld force; and
   force sensor whose output changes state when a predetermined weld force achieved.

10. A weld head for welding a workpiece comprising:
    an electrode;
    an offset electrode holder, operably coupled to an electrode holder adapter block by an electrode holder bar;
    a cylinder comprising an actuating rod operatively connected to the electrode holder adapter block for pressing the electrode onto the workpiece responsive to a flow of pressurized fluid in the cylinder;
    a force sensing mechanism for sensing when a predetermined weld force between the electrode and workpiece is reached; and
    one or more valves responsive to the sensor for blocking fluid flow to and from the cylinder when the predetermined weld force is sensed and maintaining the predetermined weld force between the electrode and the workpiece while the workpiece is being welded.

11. The weld head of claim 10 wherein the force sensing mechanism comprises:
   an adjustment device for setting a predetermined weld force level;
   a strain gauge operatively coupled to the electrode holder bar, said strain gauge being adapted to output an electrical signal which corresponds to a given weld force; and
   a force firing switch in electrical communication with the strain gauge whose output changes state when a predetermined weld force is achieved.

12. A method for welding in a welding system comprising a cylinder and an actuated cylinder rod, the method comprising the steps of:
   moving an electrode onto a workpiece with the actuating rod by introducing pressurized fluid into a first chamber of the cylinder and exhausting fluid from a second chamber of the cylinder;
   pressing the electrode against the workpiece with the actuating rod;
   sensing when a predetermined weld force between the electrode and the workpiece is reached and simultaneously sealing the pressurized fluid in the cylinder in response thereto;
   supplying electrical energy to the electrode on the workpiece to produce a weld;
   maintaining a desired pressure in the cylinder corresponding to the predetermined weld force while the workpiece is being welded;
   discontinuing the supply of electrical energy to the electrode when the weld is complete; and
   retracting the electrode after the weld is complete by first introducing pressurized fluid into the second chamber of the cylinder and next exhausting fluid from the first chamber of the cylinder.

13. A pressure regulator system for a weld head comprising a pneumatic cylinder and a weld force switch having an open position and a closed position and which moves to a closed position when a predetermined weld force is attained in the weld head, the pressure regulator system comprising:
   a switching valve comprising:
      an inflow port;
      an exhaust port;
      an up line port; and
      a down line port;
   an up line port valve operatively connected to the up line port and a down line port valve operatively connected to the down line port, wherein each of said port valves is closed in an energized state and open in a de-energized state;
   means for substantially simultaneously closing the up line port valve and the down line valve port when the weld force switch moves to the closed position; and
   means for first switching said inflow port to said up line port and said exhaust port to said down port then substantially simultaneously opening the up line port valve and the down line valve port when the weld is complete.

14. A weld head for welding a workpiece comprising:
   an electrode;
   a cylinder comprising an actuating rod operatively connected to the electrode for pressing the electrode onto the workpiece responsive to a flow of pressurized fluid in the cylinder;
   a force sensing mechanism for sensing when a predetermined weld force between the electrode and workpiece is reached; and
   a brake mechanism responsive to said sensor for fixing the actuating rod of said air cylinder in a stationary position when the predetermined weld force is sensed and maintaining the desired position of the cylinder actuating rod that corresponds to the predetermined weld force while the workpiece is being welded.

15. A reflow solder head for reflow soldering a workpiece comprising:
   an electrode;
   a cylinder comprising an actuating rod operatively connected to the electrode for pressing the electrode onto the workpiece responsive to a flow of pressurized fluid in the cylinder;
   a force sensing mechanism for sensing when a predetermined weld force between the electrode and workpiece is reached; and
   one or more valves responsive to the sensor for blocking fluid flow to and from the cylinder when the predetermined solder force is sensed and maintaining the predetermined solder force between the electrode and the workpiece while the workpiece is being reflow soldered.

16. The reflow solder head of claim 15 wherein the force sensing mechanism comprises:
   a first pressure sensor in fluid communication with an up port of the cylinder;
   a second pressure sensor in fluid communication with a down port of the cylinder;
   a reflow solder force regulator in electric communication with said first and second pressure sensors for monitoring the pressure in the upper and lower chambers of the cylinder; and
   a force firing switch in electrical communication with the reflow solder force regulator which changes state when a predetermined reflow solder force between the electrode and workpiece is reached.

17. The reflow solder head of claim 15 wherein the force sensing mechanism comprises:
   an adjustment device for setting a predetermined reflow solder force level;
   a force setting spring operatively coupled to the electrode which compresses when the electrode is pressed onto a workpiece;
   a means for measuring the compression of the force setting spring; and
   a force firing switch that changes state when the predetermined reflow solder force is reached.

18. The reflow solder head of claim 17 wherein the means for measuring the compression of the force setting spring is one or more photo diodes.

19. The reflow solder head of claim 15 wherein the force sensing mechanism comprises:
   an adjustment device for setting a predetermined reflow solder force level;
   a force transducer operatively coupled to the electrode, said transducer being adapted to output an electrical signal that corresponds to a given reflow solder force; and
   a force sensor whose output changes state when a predetermined reflow solder force is achieved.

20. The reflow solder head of claim 15 wherein the force sensing mechanism comprises:
   second cylinder operatively coupled to a lower electrode such that the pressure in a lower chamber of said second cylinder varies as the upper electrode exerts a reflow solder force on the workpiece;

an adjustment device for inputting the desired pressure level in the lower chamber of the second cylinder; and a pressure responsive switch operatively coupled to the lower chamber of the second cylinder which changes state when a predetermined pressure in the lower chamber is reached.

21. The reflow solder head of claim 15 wherein the force sensing mechanism comprises:

an adjustment device for setting a predetermined reflow solder force level;

a force setting spring operatively coupled to the workpiece which compresses when the electrode is pressed onto a workpiece;

a means for measuring the compression of the force setting spring; and a force firing sensor that changes state when a predetermined reflow solder force is reached.

22. The reflow solder head of claim 15 wherein the force sensing mechanism comprises:

an adjustment device for setting a predetermined reflow solder force level;

a force setting spring operatively coupled to a workpiece which compresses when the electrode is pressed onto a workpiece; and a force firing switch operatively coupled to and sensitive to the compression of the force setting spring such that the force firing switch closes when a predetermined reflow solder force is achieved.

23. The reflow solder head of claim 15 wherein the force sensing mechanism comprises:

an adjustment device for setting a predetermined reflow solder force level;

a force transducer operatively coupled to the workpiece which outputs an electrical signal which corresponds to a given reflow solder force; and force sensor whose output changes state when a predetermined reflow solder force achieved.

24. A reflow solder head for reflow soldering a workpiece comprising:

an electrode;

an offset electrode holder, operably coupled to an electrode holder adapter block by an electrode holder bar;

a cylinder comprising an actuating rod operatively connected to the electrode holder adapter block for pressing the electrode onto the workpiece responsive to a flow of pressurized fluid in the cylinder;

a force sensing mechanism for sensing when a predetermined reflow solder force between the electrode and workpiece is reached; and one or more valves responsive to the sensor for blocking fluid flow to and from the cylinder when the predetermined reflow solder force is sensed and maintaining the predetermined reflow solder force between the electrode and the workpiece while the workpiece is being reflow soldered.

25. The reflow solder head of claim 24 wherein the force sensing mechanism comprises:

an adjustment device for setting a predetermined reflow solder force level;

a strain gauge operatively coupled to the electrode holder bar, said strain gauge being adapted to output an electrical signal which corresponds to a given reflow solder force; and a force firing switch in electrical communication with the strain gauge whose output changes state when a predetermined reflow solder force is achieved.

26. A method for reflow soldering in a reflow soldering system comprising a cylinder and an actuated cylinder rod, the method comprising the steps of:

moving an electrode onto a workpiece with the actuating rod by introducing pressurized fluid into a first chamber of the cylinder and exhausting fluid from a second chamber of the cylinder;

pressing the electrode against the workpiece with the actuating rod;

sensing when a predetermined reflow solder force between the electrode and the workpiece is reached and simultaneously sealing the pressurized fluid in the cylinder in response thereto;

supplying electrical energy to the electrode on the workpiece to produce a reflow solder joint;

maintaining a desired pressure in the cylinder corresponding to the predetermined reflow solder force while the workpiece is being reflow soldered;

discontinuing the supply of electrical energy to the electrode when the reflow solder is complete; and retracting the electrode after the reflow solder is complete by first introducing pressurized fluid into the second chamber of the cylinder and next exhausting fluid from the first chamber of the cylinder.

27. A pressure regulator system for a reflow solder head comprising a pneumatic cylinder and a reflow solder force switch having an open position and a closed position and which moves to a closed position when a predetermined reflow solder force is attained in the reflow solder head, the pressure regulator system comprising:

a switching valve comprising:
an inflow port;
an exhaust port;
an up line port; and
a down line port;

an up line port valve operatively connected to the up line port and a down line port valve operatively connected to the down line port, wherein each of said port valves is closed in an energized state and open in a de-energized state;

means for substantially simultaneously closing the up line port valve and the down line valve port when the reflow solder force switch moves to the closed position; and means for first switching said inflow port to said up line port and said exhaust port to said down port then substantially simultaneously opening the up line port valve and the down line valve port when the reflow solder is complete.

28. A reflow solder head for reflow soldering a workpiece comprising:

an electrode;

a cylinder comprising an actuating rod operatively connected to the electrode for pressing the electrode onto the workpiece responsive to a flow of pressurized fluid in the cylinder;

a force sensing mechanism for sensing when a predetermined reflow solder force between the electrode and workpiece is reached; and a brake mechanism responsive to said sensor for fixing the actuating rod of said air cylinder in a stationary position when the predetermined reflow solder force is sensed and maintaining the desired position of the cylinder actuating rod that corresponds to the predetermined reflow solder force while the workpiece is being reflow soldered.

* * * * *